(12) United States Patent
Li et al.

(10) Patent No.: US 11,638,341 B2
(45) Date of Patent: Apr. 25, 2023

(54) ISOLATED CONVERTER AND LED DRIVER USING THE ISOLATED CONVERTER

(71) Applicant: SIGNIFY HOLDING B.V., Eindhoven (NL)

(72) Inventors: Ming Li, Shanghai (CN); Bernd Clauberg, Schaumburg, IL (US); Yuhong Fang, Naperville, IL (US); Johannes Petrus Wernars, Megen (NL); Liang Hong, Shanghai (CN); Ashwin Premraj, Des Plaines, IL (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/619,550

(22) PCT Filed: Mar. 30, 2020

(86) PCT No.: PCT/EP2020/058975
§ 371 (c)(1),
(2) Date: Dec. 15, 2021

(87) PCT Pub. No.: WO2020/254003
PCT Pub. Date: Dec. 24, 2020

(65) Prior Publication Data
US 2022/0312565 A1    Sep. 29, 2022

(30) Foreign Application Priority Data

Jun. 21, 2019 (WO) ............... PCT/CN2019/092337
Aug. 26, 2019 (EP) .................................... 19193580

(51) Int. Cl.
*H05B 45/30* (2020.01)
*H05B 45/385* (2020.01)

(52) U.S. Cl.
CPC ................................. *H05B 45/385* (2020.01)

(58) Field of Classification Search
CPC .... H05B 45/37; H05B 45/355; H05B 45/382; H05B 45/385; H05B 45/395;
(Continued)

(56) References Cited

U.S. PATENT DOCUMENTS 6,775,163 B2   8/2004  McDonald et al.
9,887,630 B2 *  2/2018  Bucheru ........... H02M 3/33523
(Continued)

FOREIGN PATENT DOCUMENTS

| EP | 0023735 A1 | 2/1981 |
| JP | 2003134812 A | 5/2003 |
| JP | 2016163537 A | 9/2016 |

*Primary Examiner* — Tung X Le

(57) ABSTRACT

An isolated converter has a transformer with a primary winding (in a primary side circuit) and a secondary winding magnetically coupled to the primary winding. A first Y-capacitor is electrically connected between the primary side circuit and the secondary winding. The detection circuit is for detecting information at the primary side, preferably information about the input supply received at the input, and more preferably the information is that whether the input supply is an alternating current (AC) supply or a direct current (DC) supply, and the detection circuit includes the first Y-capacitor. The detection circuit enables the detected information to be provided directly to a secondary side controller, without needing opto-isolators or other isolated data transmission. The detection circuit (20) comprises a capacitor divider comprising the first Y-capacitor (C5), and further comprising a second impedance and a third capacitor (C7) connected in series with the first Y-capacitor (C5), with the first Y-capacitor (C1), the second impedance, and the third capacitors (C5, C6, C7) in series between a primary side ground (PGND) and the input (12), wherein the detection circuit is for detecting a voltage across a second impedance to obtain a signal indicating the information at (Continued)

the primary side. Preferably the second impedance comprises a second capacitor (C6).

15 Claims, 7 Drawing Sheets

(58) Field of Classification Search
CPC ........... H05B 45/3578; H05B 45/3725; H02M 1/327; H02M 3/33507
See application file for complete search history.

(56) References Cited

U.S. PATENT DOCUMENTS

| | | | |
|---|---|---|---|
| 10,128,740 B1 * | 11/2018 | Xiong | H05B 47/14 |
| 2010/0194445 A1 * | 8/2010 | Balakrishnan | H02M 3/33507 |
| | | | 327/108 |
| 2011/0176344 A1 | 7/2011 | Xu | |
| 2013/0063047 A1 * | 3/2013 | Veskovic | H05B 45/385 |
| | | | 315/307 |
| 2013/0249862 A1 | 9/2013 | Xu et al. | |
| 2015/0103568 A1 | 4/2015 | Del Carmen, Jr. | |
| 2015/0109832 A1 | 4/2015 | Heo et al. | |
| 2016/0111962 A1 * | 4/2016 | Mao | H02M 3/33507 |
| | | | 363/21.16 |
| 2016/0172981 A1 * | 6/2016 | Gritti | H02M 1/4241 |
| | | | 363/21.12 |
| 2016/0302268 A1 * | 10/2016 | Dunser | H05B 45/50 |

* cited by examiner

ISOLATED CONVERTER AND LED DRIVER USING THE ISOLATED CONVERTER

CROSS-REFERENCE TO PRIOR APPLICATIONS

This application is the U.S. National Phase application under 35 U.S.C. § 371 of International Application No. PCT/EP2020/058975, filed on Mar. 30, 2020, which claims the benefits of European Patent Application No. 19193580.8, filed on Aug. 26, 2019 and Chinese Patent Application No. PCT/CN2019/092337, filed on Jun. 21, 2019. These applications are hereby incorporated by reference herein.

FIELD OF THE INVENTION

This invention relates to isolated converters for example for use in LED drivers.

BACKGROUND OF THE INVENTION

Isolated converters, such as flyback converters, are used for both AC/DC and DC/DC conversion, with galvanic isolation provided between the input and any outputs. A flyback converter functions as a buck-boost converter with the inductor split to form a transformer, so that the voltage ratios are multiplied with an additional advantage of isolation.

In the on-state of the converter, energy is transferred from the input voltage source to the transformer, during which time an output capacitor supplies energy to the output load. In the off-state, the energy is transferred from the transformer to the output load (and the output capacitor). This is called the freewheeling phase.

Isolated topologies such as flyback topologies are widely used in LED drivers. For various reasons, such as for precise output current control at deep dimming levels, a microcontroller unit (MCU) is generally configured at the secondary side of the converter to realize smart or digital control. Here, "configured at the secondary side" usually means the MCU is electrically connected to the secondary winding, or shares the same ground as the LED, and the secondary winding. This avoids any level shifting or inaccuracy in the current sensing and control.

Some applications require the driver to be able to function with a backup power supply to protect against mains supply issues, for example for emergency lighting applications, or for diagnostic functions. In such cases, it is desirable to detect information relating to the input supply, and configure the MCU to behave differently according to the detected information.

Detecting the input, e.g. mains, signals and transferring information relating to the input signals to the secondary side MCU is a challenge. There are some existing solutions, but the circuits are somewhat cumbersome or can only cover part of the functional requirements.

A first known approach is to use an additional MCU to directly measure all the mains related information at the primary side. Here, "at the primary side" means the MCU shares the ground of the primary winding and input signal and no level shifting is used. An isolated optical coupling is then used to transfer the information to the secondary side MCU. Opto-couplers are used for this purpose to bridge the primary and secondary sides. This solution requires a significant amount of additional circuitry.

A second known approach is to make use of a high voltage capacitor at the primary side to detect the mains input. If the input supply is an ac voltage, a sinusoidal voltage signal can be generated and again a signal is transferred to the secondary side using an opto-coupler. If the input supply is a dc voltage, a constant voltage signal can be generated, so that the MCU at the secondary side can distinguish between an ac or dc input supply. This solution also requires additional circuitry and is limited in the detection of different input characteristics.

There is therefore a need for an isolated converter circuit which enables low cost and simple detection of the input supply characteristics and the supply of this information to the secondary side of the isolated converter circuit.

SUMMARY OF THE INVENTION

US20150109832A1 discloses a flyback converter with a delivery unit delivering the control information to the primary side, the delivering unit including a Y-capacitor that provides an EMI noise path between the primary side and the secondary side.

JP2016163537A discloses a capacitor C15 connected across the primary side and the secondary side.

US20150103568A1 discloses a power converter with a buffer capacitor across the input, not across the primary side and the secondary side.

It is a concept of the invention to provide a capacitor between a primary side and a secondary side of the transformer of an isolated converter, and to use this capacitor as part of a detection circuit for detecting whether the input receives an alternating current supply or a direct current supply. The detection circuit may then be at the secondary side and thus provide information directly to a controller at the secondary side. The capacitor may already exist as a well known Y-capacitor in the isolated converter, and the concept of the invention is to re-use that Y capacitor as a part of a detection circuit to detect information of the primary side, with the detection circuit at the secondary side. More broadly, the detection circuit including the Y-capacitor can detect various information of the input supply, besides whether it is AC or DC.

The invention is defined by the claims.

According to examples in accordance with an aspect of the invention, there is provided an isolated converter comprising:
an input adapted to receive an input supply;
an output; and
a transformer which comprises a primary winding connected to the input and a secondary winding magnetically coupled to the primary winding and connected to the output, the primary winding being connected in a primary side circuit;
a first Y-capacitor electrically connected between the primary side circuit and the secondary winding,
wherein the converter further comprises:
a detection circuit for detecting information at the primary side, wherein the detection circuit includes the first Y-capacitor.

Preferably, the detection circuit comprises a capacitor divider comprising the first Y-capacitor, and further comprising a second impedance and a third capacitor connected in series with the first Y-capacitor, with the first Y-capacitor, the second impedance and the third capacitors in series between a primary side ground and the input, wherein the detection circuit is for detecting a voltage across a second impedance to obtain a signal indicating the information at the primary side.

Here "connected" means directly electrically connected, as distinguished from a magnetic coupling. This converter provides a capacitor between the primary side (such as the primary side ground) and the secondary side (such as the secondary side ground), and it forms part of a detection circuit for detecting the nature of the signal at the input. The main circuitry of the detection circuit is provided at least at the secondary side, enabling the detected information to be provided directly to a secondary side controller, without needing opto-isolators or other isolated data transmission. In short, the first Y-capacitor achieves the dual functions of transferring the primary side information across the isolation barrier of the transformer, as well as the (known) Y-capacitor function of controlling EMI.

Preferably, the information is about the input supply received at the input. More preferably, the information is whether the input supply is an AC supply or a DC supply. The primary winding is part of a primary side circuit which for example comprises a main switch, and the transformer is used for commuting power as the main switch is turned on and off. Alternatively, some high frequency modulated signal, such as power line communication signal coded, in a high frequency, in the input supply can also be transferred across the isolation barrier via the Y-capacitor. One step further, in case the input supply is an AC supply, an embodiment enables the frequency of the ac input mains signal to be determined.

The converter is for example a switch mode power converter, and the main switch is the power switch of the switch mode power converter. Many different topologies are possible. For example the converter may comprise a flyback converter.

The detection circuit is preferably electrically connected to a secondary side ground terminal.

In one preferred embodiment, the second impedance comprises a second capacitor. This embodiment further provides good isolation and frequency selection/filter function. Alternatively, the second impedance can also be a resistor if the first Y-capacitor and the third capacitor are already sufficient for frequency selection.

In one implementation of the capacitor divider and the detection circuit, a first interconnection of the first Y-capacitor and the second capacitor is connected to a secondary side ground, and a second interconnection of the second capacitor and the third capacitor with respect to the secondary side ground is adapted to provide a signal indicating whether the input receives an alternating current supply or a direct current supply.

The detection circuit is thus a series capacitor network, with one of the nodes providing the detection signal. The first Y-capacitor provides a bridge between the primary side ground and the secondary side ground, as well as enabling detection of the characteristics of the input. The third capacitor provides a bridge between the detection circuit (in particular the second interconnection) and the input at the primary side.

A resistor may also be provided in series with the first to third capacitors, wherein said resistor is connected between the input and the third capacitor. This provides improved electromagnetic interference performance.

The first and third capacitors each preferably comprise one or more Y capacitors, and the second capacitor comprises one or more capacitors (which may be of any type) in series.

The first and third capacitors both bridge between the primary and secondary sides, so the use of Y capacitors is preferred. The second capacitor may take other forms.

The detection circuit is for example adapted to determine that:

the input receives the alternating current supply, when the voltage at the second interconnection varies cyclically, and the input receives the direct current supply, when the voltage at the second interconnection does not vary cyclically.

Thus, the nature of the signal at the second interconnection is indicative of the type of input received. The second interconnection may be considered to define a detection node. The detection circuit is in particular used to distinguish between an ac mains input and a dc input, for example from an emergency backup supply.

The detection circuit for example further comprises a transistor circuit connected to the second interconnection to process the voltage.

In one example. the transistor circuit comprises a diode-connected transistor between a transistor circuit input and the secondary side ground, a pull up resistor connected to a voltage reference and a pull down transistor connected to the secondary side ground, wherein the diode-connected transistor is between a control gate of the pull down transistor and the secondary side ground, and wherein the junction between the pull up resistor and the pull down transistor comprises a detection output.

The diode-connected transistor prevents excessive negative voltages in the circuit. The detection output may be considered to be a binary signal, either pulled up to a high voltage rail or pulled down to the secondary side ground.

In response to a dc input, the three capacitors function as a voltage divider so the second interconnection and hence the input to the transistor circuit is a constant voltage. The pull down transistor is turned off so the detection output is pulled high. In response to an ac input, the voltage at the second interconnection varies cyclically and the pull down transistor is turned on and off cyclically. This generates a PWM detection output.

Thus, the detection output can be interpreted as resulting from an ac or dc input. The circuit can also distinguish between an ac input and a rectified ac input, in that the PWM signal will have a different duty cycle.

Instead, an analogue detection signal is possible (rather than a PWM signal) by using a more complicated circuit, such as a voltage follower circuit instead of a pull down transistor.

The transistors may be packaged in a single chip/IC, with six pins, with a respective set of three pins for each transistor.

The converter may further comprise a resistor between the control gate of the pull down transistor and the secondary side ground and a resistor between the input of the transistor circuit and the second interconnection.

The resistors function as a resistive divider to set the suitable control voltage level for the pull down transistor.

A secondary side control circuit may be provided to which the detection output is provided, and adapted to control the output of the converter according to the detection output, wherein the secondary side control circuit is electrically connected to the secondary side ground.

In another implementation of the capacitor divider and the detection circuit, a second interconnection of the second capacitor and the third capacitor is adapted is connected to a secondary side ground, and a first interconnection of the first Y-capacitor and the second capacitor with respect to the secondary side ground is adapted to provide a signal indicating frequency of the ac input mains signal. This embodiment provides an alternative circuit of the capacitor divider and the detection circuit with respect to the secondary side ground. It can be understood that the ground position is not limited and can be selected by those skilled in the art according to the requirement.

The input is usually an equivalent of the earth ground.

The converter may further comprise a rectifier between the input and the primary winding, a capacitor across the rectifier input, and a capacitor across the rectifier output, wherein the third capacitor is connected to the input before the rectifier.

The invention also provides a LED driver comprising an isolated converter as defined above comprising an input for connection to an external power supply and an output for connection to a LED load.

The invention also provides a lighting device comprising the LED driver as defined above the LED load connected to the LED driver.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
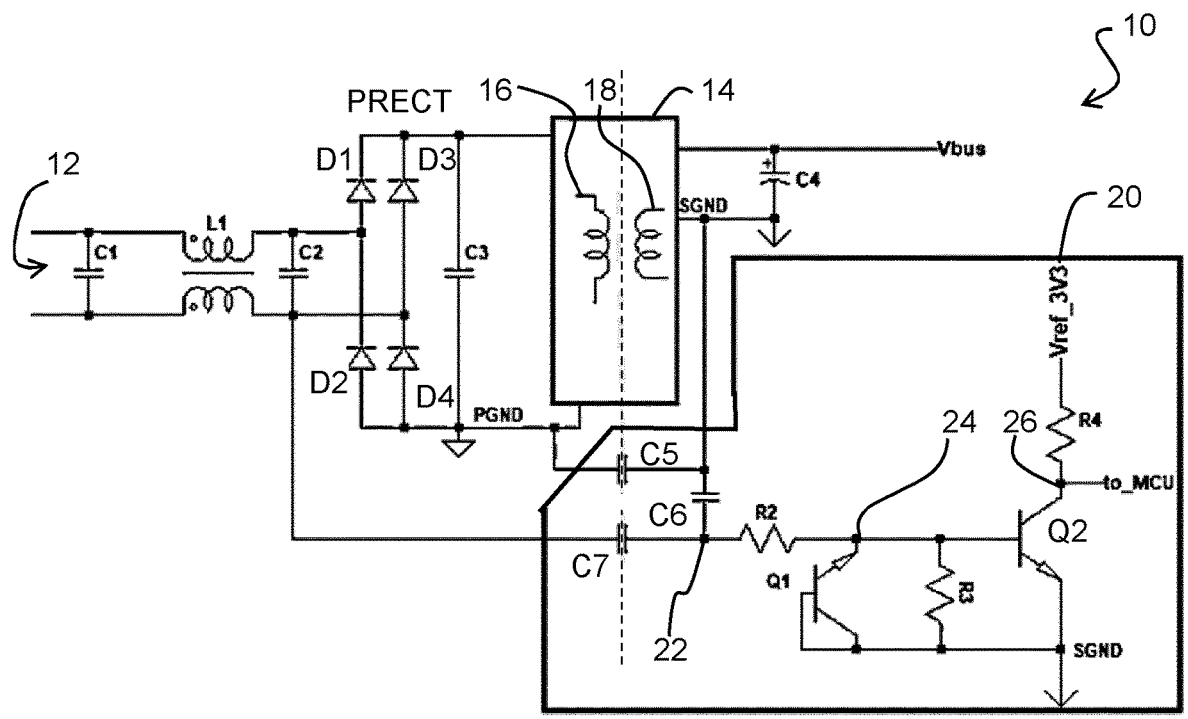
FIG. 1 shows a generic isolated converter with one example of a detection circuit in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an isolated converter which has a transformer with a primary winding (in a primary side circuit) and a secondary winding magnetically coupled to the primary winding. A first Y-capacitor is electrically connected between the primary side circuit and the secondary winding. The detection circuit is for detecting information at the primary side, such as information about the input supply of the converter, more preferably whether the input receives an alternating current supply or a direct current supply, or high frequency-modulated signal on the input supply. Importantly, the detection circuit includes the first Y-capacitor. The detection circuit enables the detected information to be provided directly to a secondary side controller, without needing opto-isolators or other isolated data transmission.

FIG. 1 shows a generic isolated converter 10 with one example of a detection circuit in accordance with the invention.

The isolated converter 10 comprises an ac input 12, and an output Vbus, wherein the output is isolated from the input by a transformer circuit, shown generally as 14. The transformer circuit comprises a primary winding 16 connected to the input and a secondary winding 18 magnetically coupled to the primary winding 16 and connected to the output Vbus. The primary winding is connected in a primary side circuit which is not shown in FIG. 1. The transformer circuit 14 can take different forms depending on the converter topology.

The ac input is connected to the input of a full bridge rectifier D1 to D4 through an EMI filter and smoothing capacitor arrangement C1, C2, L1. For the purposes of this description, the "input" to the converter may be taken to be any pre-rectified signal, such as the EMI-filtered signal which is supplied to the rectifier, or the ac input 12 before the EMI filter. The example of FIG. 1 uses the input to the rectifier as the signal which is to be coupled to the secondary side to convey information about the input 12.

A smoothing capacitor C3 is provided across the output of the rectifier, between a primary side ground PGND and a primary side rectified output PRECT. The rectifier output is provided to the primary side circuit of the transformer circuit 14.

The output of the transformer circuit 14 defines the circuit output, between a secondary side ground SGND and a dc output line Vbus. A smoothing capacitor C4 is provided across the output.

The invention provides a detection circuit 20 which is for detecting the characteristics of the supply to the ac input 12, in particular to determine if the input is an ac mains signal or a dc signal, for example from a back-up power supply. The detection circuit preferably also enables the frequency of the ac input mains signal to be determined. Optimally, the circuit may also be designed to distinguish between an ac input and a rectified ac input.

The detection circuit 20 is at the secondary side and connects to the secondary side ground SGND. The detection circuit 20 is also coupled to the primary side through two Y-capacitors.

A first Y-capacitor C5 is electrically connected between the primary side, in particular the primary side ground PGND, and the secondary winding, in particular the secondary side ground SGND. This capacitor is known for improving EMI performance. This first Y capacitor is proposed by the inventor as a part of a novel detection circuit, which Y capacitor can convey information at the primary side to the secondary side.

The first Y-capacitor is part of a capacitor divider comprising the first Y-capacitor C5, and further comprising a second capacitor C6 and a third capacitor C7 connected in series with the first Y-capacitor C5. The first to third capacitors C5, C6, C7 are in series between the primary side ground PGND and, in this example, the input to the rectifier (after the EMI filter). A first interconnection of the first Y-capacitor C5 and the second capacitor C6 is connected to the secondary side ground. A second interconnection 22 of the second capacitor C6 and the third capacitor C7 provides a signal indicating whether the input receives an alternating current supply or a direct current supply. This second interconnection 22 functions as a detection node. The embodiment take the second capacitor as an example, and it should be understood that the second capacitor is in essence an impedance and resistors can also be used. Since the principles are similar, the description would not describe the invention from the perspective of resistor as the second impedance.

The third capacitor C7 is another Y-capacitor which, like the first Y-capacitor C5, is electrically connected between the primary side, in particular the input to the rectifier, and the detection node of the detection circuit 20.

The first Y-capacitor C5 of the series network is the first Y-capacitor. The second capacitor C6 of the series network comprises one or more series capacitors, which do not need to be Y-capacitors. The third capacitor C7 of the capacitor network is a second Y-capacitor.

The detection node provides a signal indicating whether the input receives an alternating current supply or a direct current supply. The signal may also be interpreted to determined that the input receives a rectified ac signal.

The detection circuit thus has a series capacitor network. The nodes connect to the input, to the primary side ground and to the secondary side ground. The capacitors which bridge between the primary and secondary sides are Y-capacitors.

The first Y-capacitor C5 improves EMI performance as well as forming part of the detection circuit. It has a low capacitance value such as 3.3 nF.

The second capacitor C6 is the main detection element for the detection circuit. Taking a voltage surge (4 kV) and burst into account, the capacitor C6 for example has a capacitance of 1 nF and is rated at 1 kV The voltage drop on C6 is the voltage processed by the detection circuit. The second capacitor C6 enables the voltage at the detection node to vary, rather than being tied to the secondary side ground SGND.

The third capacitor C7 provides a coupling of the input voltage to the detection circuit.

The detection circuit is adapted to determine that the input receives an alternating current supply, when the voltage at the detection node varies cyclically, and to determine that the input receives a direct current supply when the voltage at the detection node does not vary cyclically, for example, the direct current supply only charges the capacitors once and the voltage varies only for only charging up time period.

For this determination, the detection circuit comprises a transistor circuit connected to the detection node (i.e. the second interconnection 22 between the second and third capacitors) to process the detection node voltage.

The transistor circuit comprises a diode-connected transistor Q1 between a transistor circuit input 24 and the secondary side ground SGND, a pull up resistor R4 connected to a voltage reference Vref_3V3 (e.g. a 3.3V IC supply voltage) and a pull down transistor Q2 connected to the secondary side ground SGND. The diode-connected transistor Q1 is between the base (i.e. the control gate) of the pull down transistor Q2 and the secondary side ground SGND. The junction between the pull up resistor R4 and the pull down transistor Q2 comprises a detection output 26. This detection output 26 is provided to a microcontroller unit (not shown) at the secondary side. The 3.3V IC supply is for example the supply for the microcontroller. The microcontroller is adapted to control the output of the converter according to the detection output, and is electrically connected to the secondary side ground SGND.

The diode-connected transistor Q1 prevents excessive negative voltages in the circuit. In particular it has very low leakage current, for example below the permitted I/O leakage of the microcontroller, such as 110 nA.

The detection output 26 may be considered to be a binary signal, either pulled up to the high voltage rail Vref_3V3 or pulled down to the secondary side ground SGND.

In response to a dc input, the three capacitors function as a voltage divider so the detection node, and hence the input node 24 to the transistor circuit, is at a constant voltage. The voltage level (which depends on the capacitor sizes) is such that the pull down transistor Q2 is turned off so the detection output 26 is pulled high. In response to an ac input, the voltage at the detection node (the second interconnection 22) varies cyclically and the pull down transistor is turned on and off cyclically. This generates a PWM detection output.

Thus, the detection output can be interpreted as resulting from an ac or dc input. The circuit can also distinguish between an ac input and a rectified ac input, in that the PWM signal will have a different duty cycle. Instead, an analogue detection signal is possible (rather than a PWM signal) by using a more complicated circuit, such as a voltage follower circuit instead of a pull down transistor.

A resistor R3 is connected between the control gate of the pull down transistor Q2 and the secondary side ground SGND and a resistor R2 is between the input of the transistor circuit and the detection node. The resistors function as a resistive divider to set the suitable control voltage level for the pull down transistor. In particular, in response to a dc input, the voltage resulting from the capacitor divider and the resistor divider is below the turn on voltage for the pull down transistor.

Figure 2:
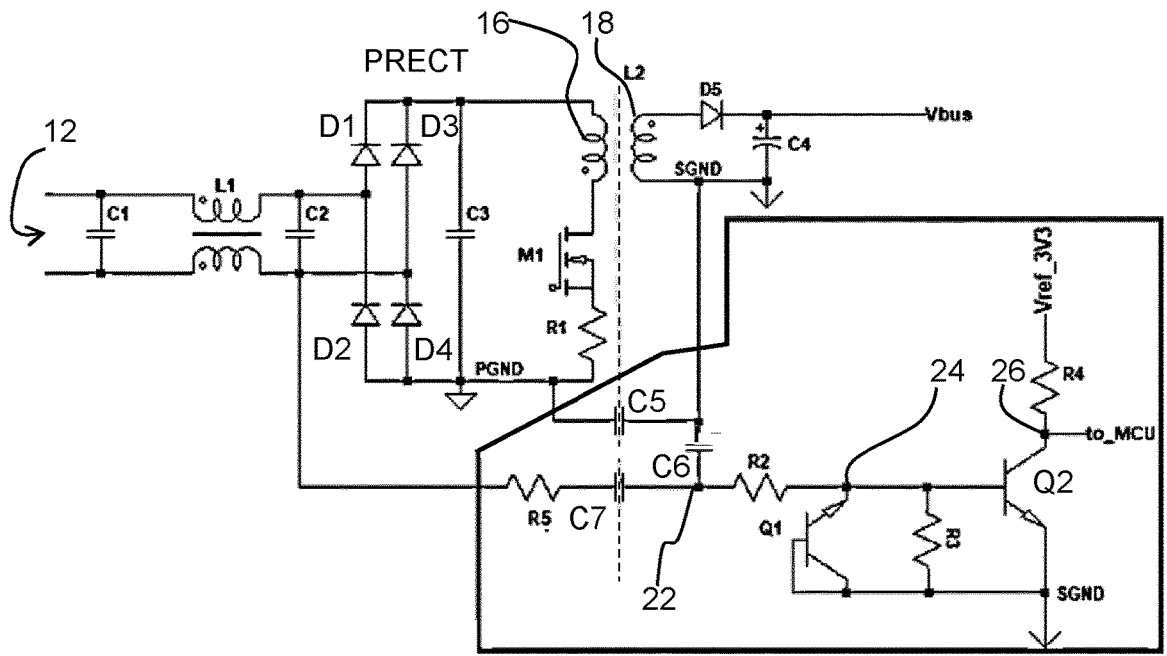
FIG. 2 shows the circuit of FIG. 1 with one example of an implementation of the primary side circuit.

FIG. 2 shows the circuit of FIG. 1 with one example of an implementation of the primary side circuit.

The primary side circuit comprises a main switch M1 in series with the primary side winding 16. The transformer is used for commuting power as the main switch is turned on and off in known manner. FIG. 2 also shows a current sense resistor R1.

FIG. 2 thus shows an implementation in the form of a switch mode power converter, and in particular a flyback converter, and the main switch M1 is the power switch of the converter.

FIG. 2 additionally shows another resistor R5 is in series with the first to third capacitors C5, C6, C7, and connected between the rectifier input and the first to third capacitors C5, C6, C7. This provides improved electromagnetic interference performance.

Figure 3:
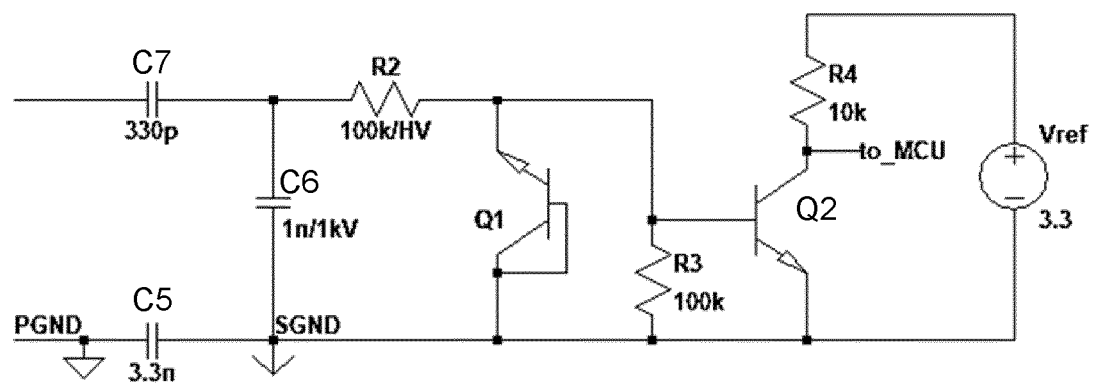
FIG. 3 shows the detection circuit in more detail, in particular with examples of component values.

FIG. 3 shows the detection circuit in more detail, in particular with examples of component values. These are simply to present an order of magnitude and are not intended to be limiting in any way.

Figure 4:
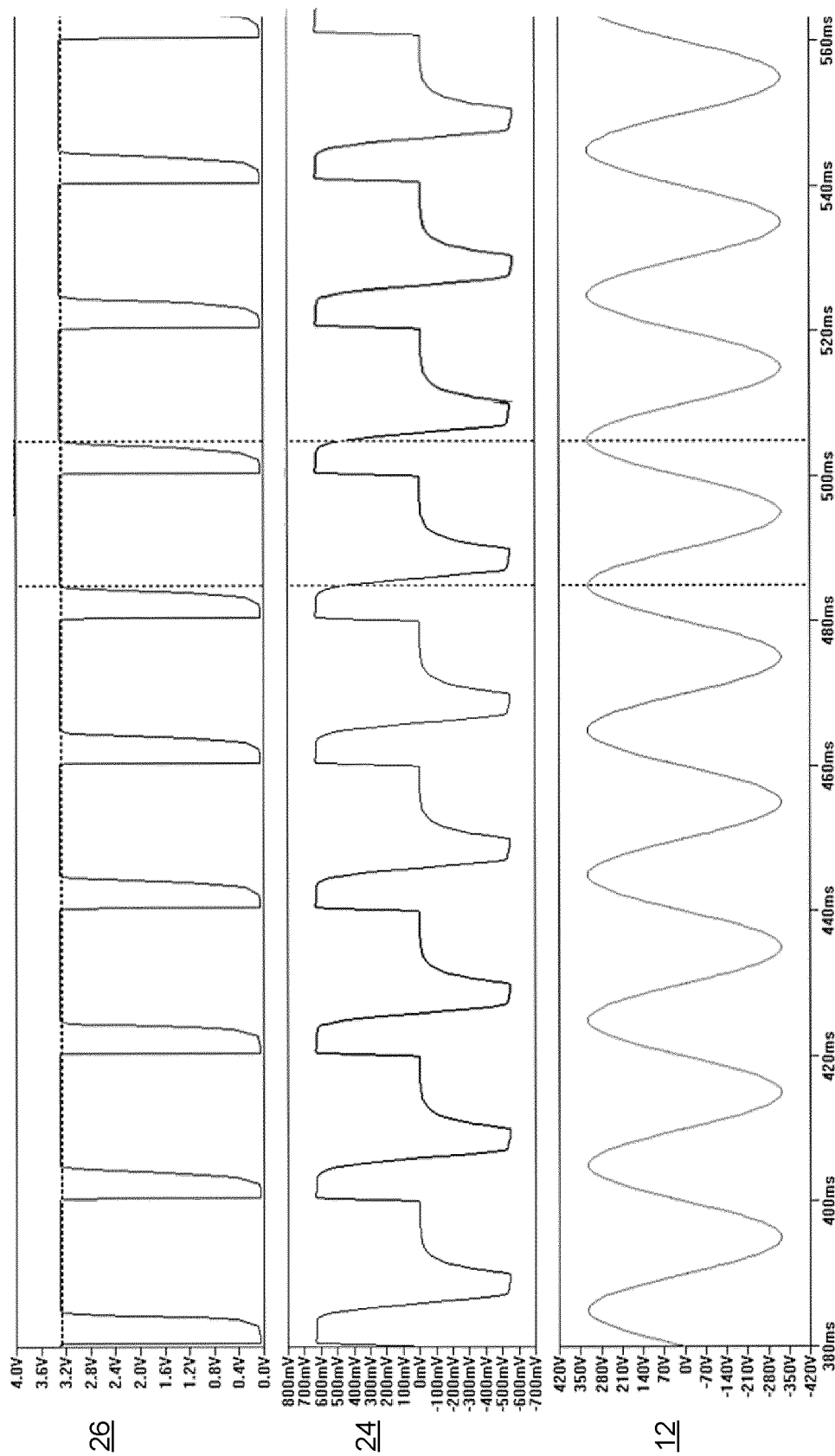
FIG. 4 shows a first set of plots to explain the circuit operation in response to an ac input.

FIG. 4 shows a first set of plots to explain the circuit operation in response to an ac input.

The top plot shows the detection output at node 26, the middle plot shows the detection input at the transistor circuit input node 24 and the bottom plot shows the input 12.

The detection output is a PWM signal.

Figure 5:
FIG. 5 shows a second set of plots to explain the circuit operation in response to a dc 230V input.

FIG. 5 shows a second set of plots to explain the circuit operation in response to a dc 230V input.

The top plot again shows the detection output at node 26, the middle plot shows the detection input at the transistor circuit input node 24 and the bottom plot shows the input 12. The detection input remains close to zero such that the pull down transistor Q2 is not turned on. The detection output is a constant 3.3V signal.

Figure 6:
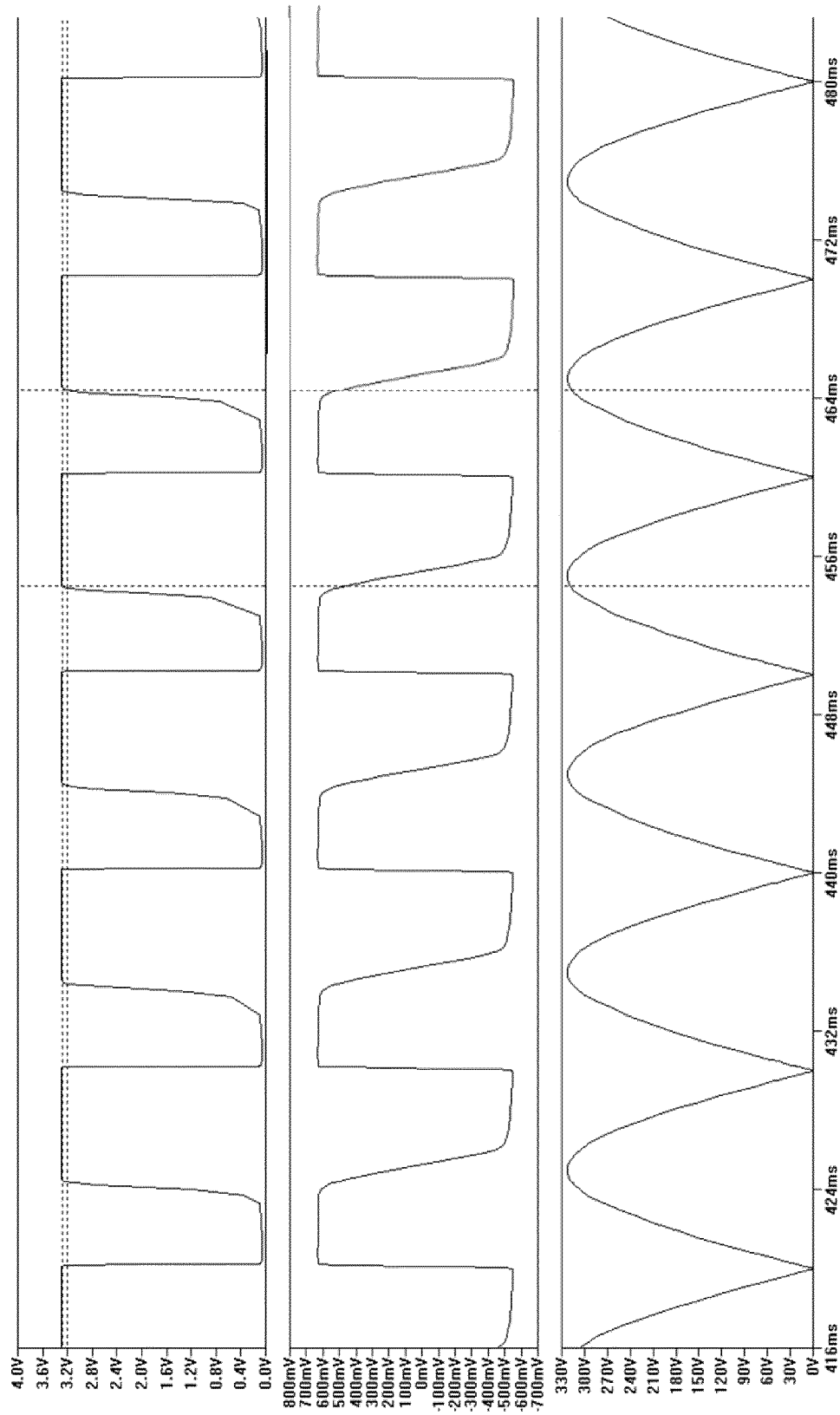
FIG. 6 shows a third set of plots to explain the circuit operation in response to a rectified ac input.

FIG. 6 shows a third set of plots to explain the circuit operation in response to a rectified ac input.

The top plot again shows the detection output at node 26, the middle plot shows the detection input at the transistor circuit input node 24 and the bottom plot shows the input 12.

The plots are similar to FIG. 4 but the duty cycle of the detection output has changed (increased). Thus, it is possible to distinguish between an ac input signal and a rectified ac input signal.

The invention is of interest for all isolated LED drivers with a mains guard, or for emergency lighting applications. It is for example of interest for wireless drivers, in which the control circuit at the secondary side receives wireless control signals. For example, it may be used in a 36 W wireless driver design, with a flyback (PFC) converter and DC/DC buck converter. The controller is preferably at the secondary side, so the output side is isolated from the mains input by the flyback transformer and by the Y capacitors.

In the above embodiment, it is the first interconnection between the Y capacitor C5 and the second capacitor C6 that connects to the secondary side ground (SGND). Below will introduce an alternative embodiment, wherein the second interconnection between the second capacitor and the third capacitor is connected to the secondary side ground, but still the voltage across the second capacitor is detected to determine information at the primary side.

Figure 7:
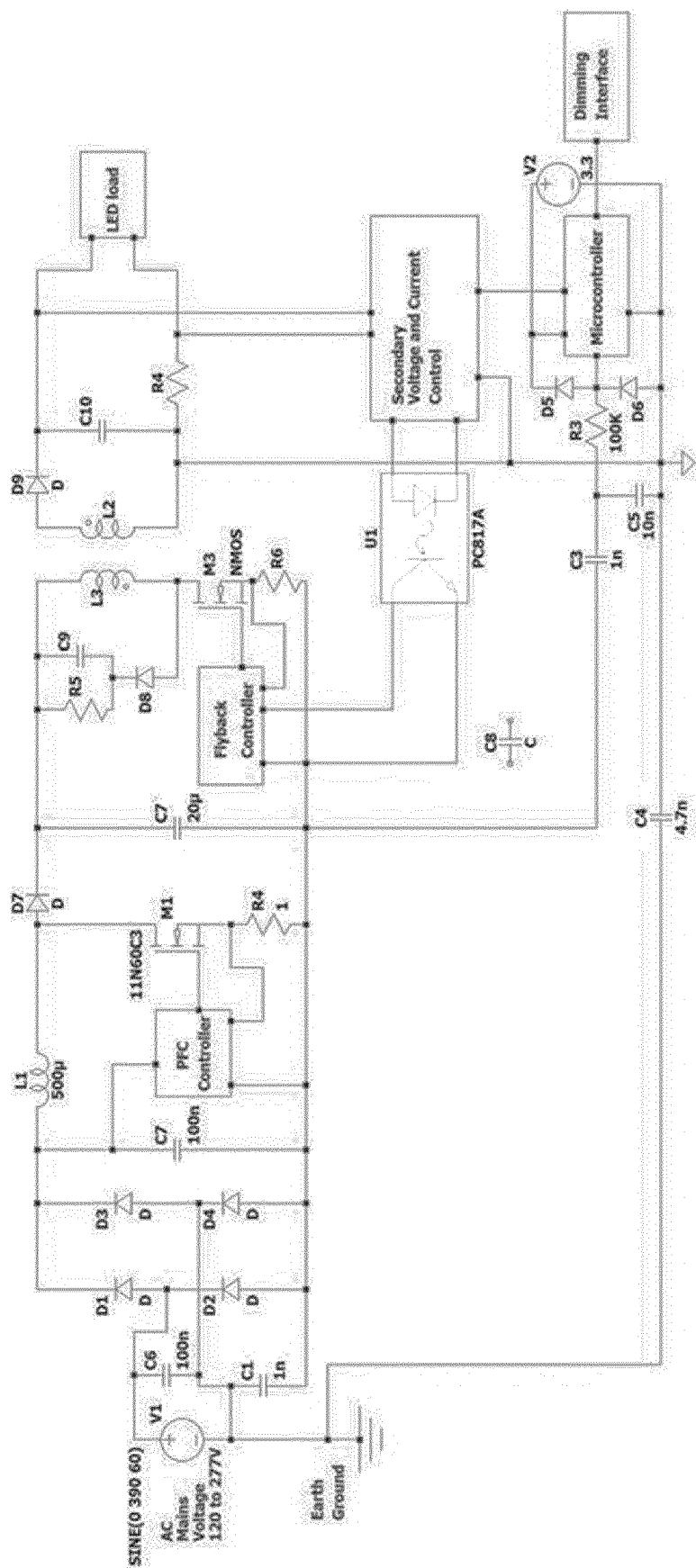
FIG. 7 shows a circuit with a boost PFC first stage and a flyback DC/DC converter stage.

FIG. 7 shows this embodiment, for easily understanding, the capacitors C3, C5 and C4 in FIG. 7 are corresponding to the capacitors C5, C6 and C7 respectively. In FIG. 7, the interconnection between the capacitors C5 and C4 connects to the secondary side ground. The voltage across the capacitor C5 is used for detecting information at the primary side, more specifically the frequency of the AC input. The other end of the capacitor C4 connects to the earth ground which is also the input of the AC.

The main elements of this invention are as follows:
Adding a low voltage and higher value capacitor C5 (as compared to the original Y-cap C3 across the isolation barrier) in series with the Y-cap C3 across the isolation barrier, and then measuring the voltage signal of the added capacitor C5 with respect to the secondary side ground. This is shown in the schematic in FIG. 7.

A MCU on the secondary isolation side (which is already present in LED drivers with diagnostic functions) is used to measure the signal between the capacitors across the isolation barrier and can detect the frequency of this signal. Some signal shaping is used to clamp the upper and lower voltage to the MCU supply voltage and ground to get a type of square wave into the MCU pin, making frequency determinations more straight forward. In this case, even a simple I/O pin can be used and not required to use an ADC input of the MCU.

FIG. 7 shows a boost PFC first stage and a flyback DC/DC converter/stage, primary rectifiers (D1-D4), the capacitor C3 that bridges the isolation from the primary of the LED driver to the secondary, capacitor C4 that connects the output stage to earth ground. Additionally, a voltage source V2 of 3.3V provides supply to the micro processor circuit on the secondary side. The additional circuits added as part of this invention are R3, C5, D5 and D6. C5 is added in series with C3 (a 1:10 divider capacitor with C3). Then the voltage in between C3 and C5 is sensed via R3 directly to a MCU pin. To limit the voltage at the MCU pin to the typical ground and Vdd, clamping diodes D6 and D5 are added.

Figure 8:
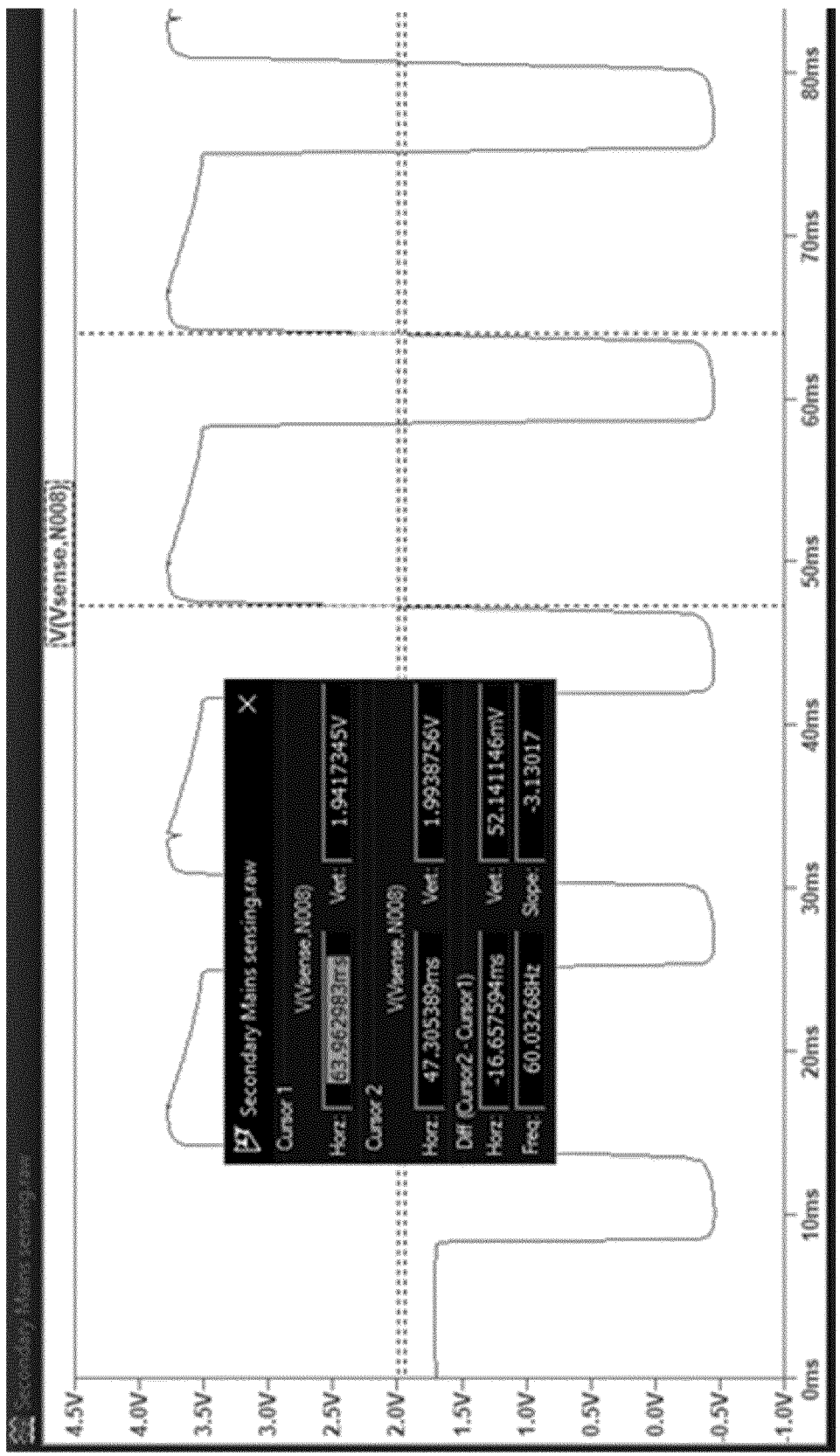
FIG. 8 shows a simulation resulting waveform observed by the MCU on "Vsense" or the voltage across D6 in the schematic of FIG. 7."

In the FIG. 8, the simulation shows the resulting waveform observed by the MCU on "Vsense" or the voltage across D6 in the schematic of FIG. 7. As one can see, the waveform the frequency measured on this waveform is 60 Hz, which is exactly the mains voltage frequency. This shows that by adding just a simple low voltage circuit on the secondary side of the isolation, one can accurately measure the mains voltage frequency without any additional components that cross the isolation barrier, making this circuit a very simple and cost effective way to measure mains voltage frequency from the isolated secondary side of an LED driver.

Variations to the disclosed embodiments can be understood and effected by those skilled in the art in practicing the claimed invention, from a study of the drawings, the disclosure and the appended claims. The above embodiment takes whether the input supply is AC or DC as the information to be detected, and in alternative embodiments, it could be high frequency modulated signal in the input supply, or some high frequency injected by the primary side circuit itself. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. An isolated converter comprising:
   an input adapted to receive an input supply;
   an output; and
   a transformer which comprises a primary winding connected to the input and a secondary winding magnetically coupled to the primary winding and connected to the output adapted to connect to a LED load, the primary winding being connected in a primary side circuit;
   a first Y-capacitor electrically connected between the primary side circuit and the secondary winding,
   a detection circuit for detecting information at the primary side, wherein the detection circuit includes the first Y-capacitor,
   wherein the detection circuit comprises a capacitor divider comprising the first Y-capacitor, and further comprising a second impedance and a third capacitor connected in series with the first Y-capacitor, with the first Y-capacitor, the second impedance and the third capacitor in series between a primary side ground and the input, and
   wherein the detection circuit is for detecting a voltage across the second impedance to obtain a signal indicating the information at the primary side.

2. The isolated converter as claimed in claim 1, wherein the detection circuit is for detecting information about the input supply received at the input,
   the primary side circuit comprises a main switch, and the transformer is used for commuting power as the main switch is turned on and off.

3. The isolated converter as claimed in claim 2, wherein the detection circuit is for:

detecting whether the input supply received at the input is an alternating current supply or a direct current supply, or signal coded, in a high frequency, in the input supply or enabling the frequency of the ac input mains signal to be determined, and, the isolated converter comprising a flyback converter.

4. The isolated converter as claimed in claim 1, wherein the detection circuit is electrically connected to a secondary side ground terminal, wherein the secondary side ground terminal is at the current flow-in terminal of the secondary winding, and the primary side ground is electrically connected to the current flow-out terminal of the primary winding.

5. The isolated converter as claimed in claim 1, wherein the second impedance comprises a second capacitor, or a resistor.

6. The isolated converter as claimed in claim 5, wherein a first interconnection of the first Y-capacitor and the second capacitor is connected to a secondary side ground, and a second interconnection of the second capacitor and the third capacitor with respect to the secondary side ground is adapted to provide a signal indicating whether the input receives an alternating current supply or a direct current supply.

7. The isolated converter as claimed in claim 5, further comprising a resistor in series with the first to third capacitors, wherein said resistor is connected between the input and the third capacitor, and wherein the first and third capacitors each comprise one or more Y capacitors, and the second capacitor comprises one or more capacitors in series.

8. The isolated converter as claimed in claim 5, wherein the detection circuit is adapted to determine that:

the input receives the alternating current supply, when the voltage at the second interconnection varies cyclically, and the input receives the direct current supply, when the voltage at the second interconnection does not vary cyclically.

9. The isolated converter as claimed in claim 8, wherein the detection circuit further comprises a transistor circuit connected to the second interconnection to process the voltage.

10. The isolated converter as claimed in claim 9, wherein the transistor circuit comprises a diode-connected transistor between a transistor circuit input and the secondary side ground, a pull up resistor connected to a voltage reference and a pull down transistor connected to the secondary side ground, wherein the diode-connected transistor is between a control gate of the pull down transistor and the secondary side ground, and wherein the junction between the pull up resistor and the pull down transistor comprises a detection output, and further comprising a resistor between the control gate of the pull down transistor and the secondary side ground and a resistor between the input of the transistor circuit and the second interconnection.

11. The isolated converter as claimed in claim 10, comprising a secondary side control circuit to which the detection output is provided, and adapted to control the output of the isolated converter according to the detection output, wherein the secondary side control circuit is electrically connected to the secondary side ground.

12. The isolated converter as claimed in claim 5, a second interconnection of the second capacitor and the third capacitor is adapted is connected to a secondary side ground, and a first interconnection of the first Y-capacitor and the second capacitor with respect to the secondary side ground is adapted to provide a signal indicating frequency of the ac input mains signal.

13. The isolated converter as claimed in claim 1, further comprising a rectifier between the input and the primary winding, a capacitor across the rectifier input, and a capacitor across the rectifier output, wherein the third capacitor is connected to the input before the rectifier, and the primary side ground is at the negative output terminal of the rectifier.

14. A LED driver comprising the isolated converter as claimed in claim 1 comprising the input for connection to an external power supply and the output for connection to the LED load.

15. A lighting device comprising the LED driver as claimed in claim 14 and the LED load connected to the LED driver.

\* \* \* \* \*